US012637041B2

(12) United States Patent
Nose et al.

(10) Patent No.: US 12,637,041 B2
(45) Date of Patent: May 26, 2026

(54) BRAKE SYSTEM FOR SADDLED VEHICLE

(71) Applicant: Honda Motor Co., Ltd., Tokyo (JP)

(72) Inventors: Tsubasa Nose, Tokyo (JP); Hiroyuki Kaneta, Tokyo (JP); Kyosuke Inada, Tokyo (JP); Yuta Kanbe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 18/277,700

(22) PCT Filed: Dec. 28, 2021

(86) PCT No.: PCT/JP2021/048777
§ 371 (c)(1),
(2) Date: Aug. 17, 2023

(87) PCT Pub. No.: WO2022/185698
PCT Pub. Date: Sep. 9, 2022

(65) Prior Publication Data
US 2024/0132029 A1 Apr. 25, 2024
US 2024/0227753 A9 Jul. 11, 2024

(30) Foreign Application Priority Data
Mar. 4, 2021 (JP) ................................. 2021-034322

(51) Int. Cl.
*B60T 8/17* (2006.01)
*B60T 7/22* (2006.01)
(Continued)

(52) U.S. Cl.
CPC .............. *B60T 8/1706* (2013.01); *B60T 7/22* (2013.01); *B60T 8/17558* (2013.01);
(Continued)

(58) Field of Classification Search
CPC . B60T 7/12; B60T 7/22; B60T 8/1706; B60T 8/17558; B60T 8/261; B60T 15/043; B60T 2201/022
See application file for complete search history.

(56) References Cited

U.S. PATENT DOCUMENTS 6,270,171 B1 * 8/2001 Krieg .................... B60T 8/3275
303/113.3
2008/0236544 A1 * 10/2008 Asada ................... F02D 11/105
123/399
(Continued)

FOREIGN PATENT DOCUMENTS

JP 2011-194994 A 10/2011
JP 2012224119 A * 11/2012
(Continued)

OTHER PUBLICATIONS

International Search Report, issued in PCT/JP2021/048777, PCT/ISA/210, dated Feb. 22, 2022.

*Primary Examiner* — John M Zaleskas
(74) *Attorney, Agent, or Firm* — Birch, Stewart, Kolasch & Birch, LLP

(57) ABSTRACT

To provide a brake system for a saddled vehicle that exerts proper braking force control considering changes in the driver's posture during deceleration. A brake system for a saddled vehicle including a control device exerting automatic control over a brake fluid pressure of a front-wheel brake and that of a rear-wheel brake according to various information, and a throttle position detector for detecting a throttle position of a rotary-type throttle operating element mounted on a steering handlebar. When an operation on the throttle operating element is detected at start of automatic control over the front-wheel brake and the rear-wheel brake, if the throttle position is less than a predetermined threshold value, the control device maintains the automatic control, (Continued)

and if the throttle position is equal to or greater than the predetermined threshold value, the control device cancels the automatic control.

1 Claim, 4 Drawing Sheets

(51) Int. Cl.
    B60T 8/1755     (2006.01)
    B60T 8/26     (2006.01)
    B60T 15/04     (2006.01)

(52) U.S. Cl.
    CPC ............ B60T 8/261 (2013.01); B60T 15/043 (2013.01); B60T 2201/022 (2013.01)

(56) References Cited

U.S. PATENT DOCUMENTS

| | | | | |
|---|---|---|---|---|
| 2010/0076661 A1* | 3/2010 | Ueoka | ..................... | B60T 8/175 701/84 |
| 2013/0041564 A1* | 2/2013 | Doi | ..................... | B60W 50/087 701/70 |
| 2014/0350811 A1* | 11/2014 | Tamaru | ................. | B60W 10/06 701/68 |
| 2015/0046054 A1* | 2/2015 | Takahashi | ............... | B60T 8/171 701/70 |
| 2015/0191176 A1 | 7/2015 | Kobana et al. | | |
| 2016/0194000 A1* | 7/2016 | Taki | ....................... | B60W 30/08 701/70 |
| 2017/0106839 A1* | 4/2017 | Uechi | ..................... | B60T 8/246 |
| 2017/0305432 A1 | 10/2017 | Nemoto | | |
| 2017/0341612 A1* | 11/2017 | Ohmori | ................. | B60W 50/10 |
| 2018/0043885 A1* | 2/2018 | Harada | ................. | B60W 10/06 |
| 2018/0072286 A1* | 3/2018 | Hirokami | .............. | B60T 8/1706 |
| 2018/0229722 A1* | 8/2018 | Taki | .......................... | B60T 7/22 |
| 2019/0009775 A1* | 1/2019 | Ito | .............................. | B60T 7/12 |
| 2019/0315347 A1* | 10/2019 | Ike | ......................... | B60W 30/09 |
| 2020/0189578 A1* | 6/2020 | Taki | ....................... | B60W 30/08 |
| 2020/0290699 A1* | 9/2020 | Haraguchi | ............ | F16D 65/183 |
| 2020/0391732 A1* | 12/2020 | Kaneta | .................. | B60W 30/09 |
| 2021/0061268 A1* | 3/2021 | Ike | ...................... | B60T 8/17558 |
| 2021/0107491 A1 | 4/2021 | Atsushi et al. | | |
| 2021/0146893 A1* | 5/2021 | Schori | ................... | B60W 10/06 |
| 2021/0213974 A1* | 7/2021 | Shimbo | .................. | G08G 1/165 |
| 2022/0161889 A1* | 5/2022 | Wahl | ..................... | B60T 8/3225 |
| 2022/0274591 A1* | 9/2022 | Ike | ...................... | B60T 8/17558 |
| 2024/0123955 A1* | 4/2024 | Inada | ................... | B60T 8/1706 |
| 2024/0123956 A1* | 4/2024 | Kaneta | ................. | B60T 8/1706 |

FOREIGN PATENT DOCUMENTS

| | | |
|---|---|---|
| JP | 2015-217852 A | 12/2015 |
| JP | 2019-73208 A | 5/2019 |
| WO | WO 2014/016910 A1 | 1/2014 |
| WO | WO 2016/056337 A1 | 4/2016 |
| WO | WO 2019/025886 A1 | 2/2019 |

* cited by examiner

BRAKE SYSTEM FOR SADDLED VEHICLE

FIELD

The present invention relates to a brake system for a saddled vehicle, and in particular, to a brake system for a saddled vehicle that enables automatic control according to information from various sensors.

BACKGROUND

Conventionally, in a brake system that enables automatic control according to information from various sensors, a configuration for controlling the braking force considering changes in the driver's posture is known.

Patent Literature 1 discloses a brake system for a motorcycle that works as follows. In exerting automatic control, the system detects the magnitude of external force acting on the rear surface of the steering handle grips. Thus, in controlling the braking force, the system takes into account whether the driver is ready for deceleration.

CITATION LIST

Patent Literature

Patent Literature 1: WO 2019/025886 A

BRIEF SUMMARY

Technical Problem

In a saddled vehicle, there may be a situation where the driver trying to recover his/her forward-leaning upper body due to deceleration puts extra force on the steering handlebars, unintentionally rotating the throttle grip. Here, if the rotation of the throttle grip at the start of or during automatic brake system control is set to immediately cancel the automatic control, the necessary automatic control will not be initiated, or a reduction in braking force may affect the vehicle's behavior.

An object of the present invention is to provide a brake system for a saddled vehicle that solves the conventional problem and exerts proper braking force control considering changes in the driver's posture during deceleration.

Solution to Problem

In order to achieve the object, a first aspect of the present invention provides a brake system for a saddled vehicle includes: a control device (70) exerting automatic control over a brake fluid pressure according to various information; and throttle position detecting means (91) for detecting a throttle position (Th) of a rotary-type throttle operating element mounted on a steering handlebar (2). When an operation on the throttle operating element is detected at start of automatic brake control, if the throttle position (Th) is less than a predetermined threshold value (Th1), the control device (70) maintains the automatic control, and if the throttle position (Th) is equal to or greater than the predetermined threshold value (Th1), the control device (70) cancels the automatic control.

In a second aspect of the present invention, when a rotary operation of the throttle operating element is detected during automatic brake control and the throttle position (Th) is equal to or greater than a predetermined threshold value (Th1), if an angular velocity ($\omega$) of the throttle operating element is less than a predetermined threshold value ($\omega$1), the control device (70) maintains the automatic control, and if the angular velocity ($\omega$) of the throttle operating element is equal to or greater than the predetermined threshold value ($\omega$1), the control device (70) cancels the automatic control.

Advantageous Effects

According to the first aspect, a brake system for a saddled vehicle includes: a control device (70) exerting automatic control over a brake fluid pressure according to various information; and throttle position detecting means (91) for detecting a throttle position (Th) of a rotary-type throttle operating element mounted on a steering handlebar (2). When an operation on the throttle operating element is detected at start of automatic brake control, if the throttle position (Th) is less than a predetermined threshold value (Th1), the control device (70) maintains the automatic control, and if the throttle position (Th) is equal to or greater than the predetermined threshold value (Th1), the control device (70) cancels the automatic control. Thus, automatic brake system control will start despite the situation where the driver trying to recover his/her forward-leaning upper body puts extra force on the steering handlebars, unintentionally slightly rotating the throttle grip. This avoids cancellation of necessary automatic control. On the other hand, when the throttle position is equal to or greater than the threshold value, the system determines that the throttle operation is intended by the driver and cancels the automatic brake system control. This achieves the vehicle's behavior desired by the driver.

In the second aspect, when a rotary operation of the throttle operating element is detected during automatic brake control and the throttle position (Th) is equal to or greater than a predetermined threshold value (Th1), if an angular velocity ($\omega$) of the throttle operating element is less than a predetermined threshold value ($\omega$1), the control device (70) maintains the automatic control, and if the angular velocity ($\omega$) of the throttle operating element is equal to or greater than the predetermined threshold value ($\omega$1), the control device (70) cancels the automatic control. There may be a situation where the driver tries to recover his/her forward-leaning upper body in deceleration suddenly started by automatic brake system control. When the driver in such a situation gradually applies force to the steering handlebars and hence slowly increases the throttle position, the system determines that the throttle operation is not intended by the driver even when the throttle position becomes equal to or greater than a predetermined threshold value, and maintains the automatic brake system control. This avoids a reduction in the braking force that would affect the vehicle's behavior. When the angular velocity of the throttle operating element is equal to or greater than the threshold value, the system determines that the throttle operation is intended by the driver and cancels the automatic brake system control. This achieves the vehicle's behavior desired by the driver.

DETAILED DESCRIPTION

Figure 1:
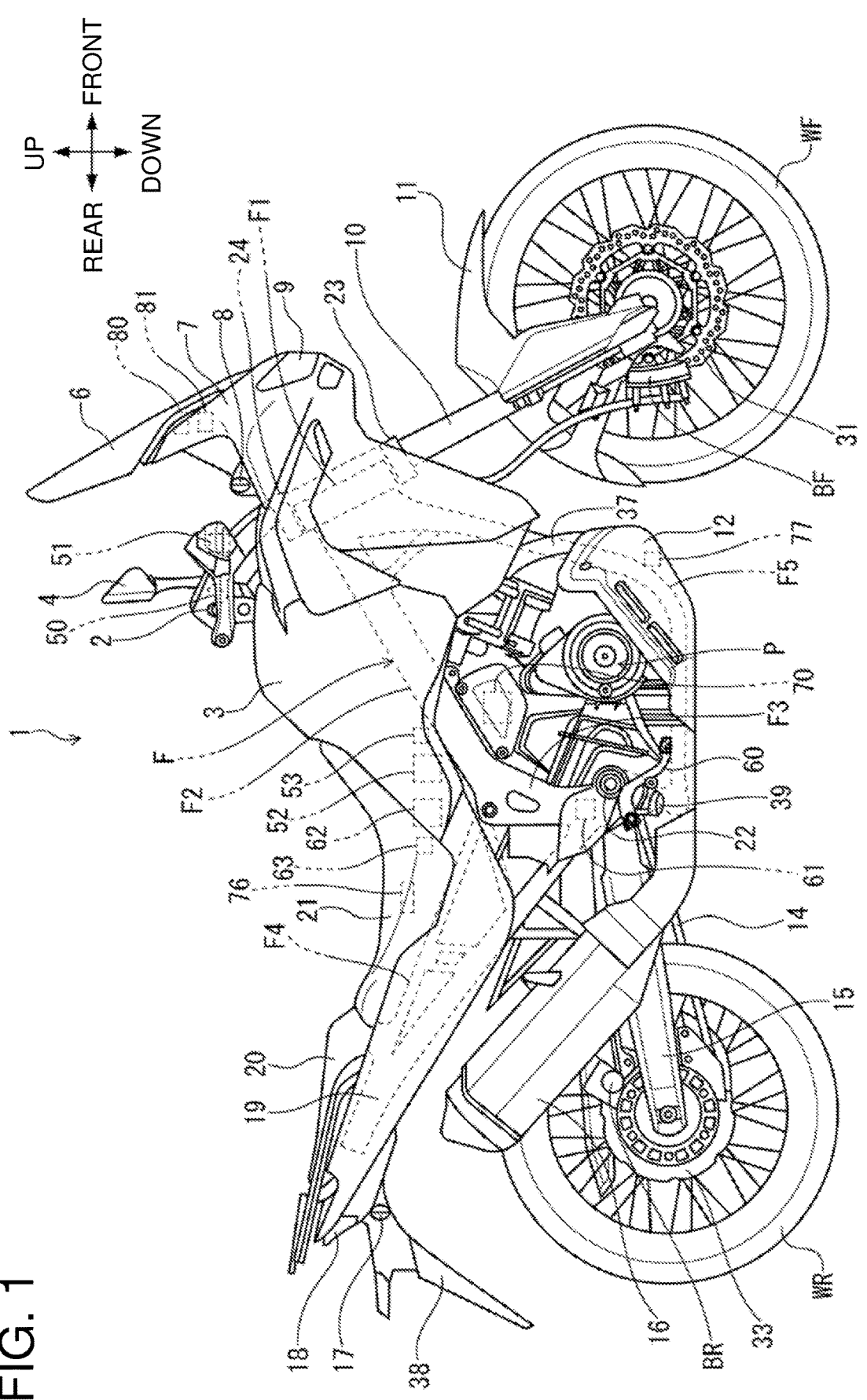
FIG. 1 is a right side view of a motorcycle to which a brake system according to one embodiment of the present invention is applied.

In the following, with reference to the drawings, a detailed description will be given of a preferred embodiment of the present invention. FIG. 1 is a right side view of a motorcycle 1 to which a brake system according to one embodiment of the present invention is applied. The motorcycle 1 is a saddled vehicle including a power unit P that transmits drive to a rear wheel WR via a drive chain 14. A head pipe F1 positioned at the front end of a vehicle body frame F swingably holds a not-shown steering stem. A bottom bridge 23 and a top bridge 24, fixed to the top and bottom of the steering stem, hold a pair of right and left front forks 10.

Bar-type steering handlebars 2 holding a pair of right and left rearview mirrors 4 are mounted on the top of the top bridge 24. A rotary-type throttle grip, i.e., a throttle operating element, and a brake lever 50, i.e., a front-wheel brake operating element, are mounted on the right one of the steering handlebars 2. On the front forks 10, a front-wheel brake caliper BF, i.e., a front-wheel brake that applies braking force to a front-wheel brake disc 31 rotating in synchronization with a front wheel WF, and a front fender 11 are mounted.

A pair of right and left main frames F2 extending diagonally downward rearward and an underframe F5 extending downward are mounted on the rear of the head pipe F1. The underframe F5 holds the power unit P from below. The main frames F2 have their rear ends coupled to a pivot frame F3 including a pivot 22 swingably holding a swingarm 15. The pivot frame F3 has its lower end coupled to the rear end of the underframe F5. A pair of right and left foot steps 39 for receiving the driver's feet are mounted on the pivot frame F3.

Surrounded and held by the main frames F2 and the underframe F5, the power unit P transmits its drive to the rear wheel WR via the drive chain 14. An underguard 12 is mounted on the bottom frontward side of the power unit P. Through an exhaust pipe 37 extending inner than the underguard 12, the power unit P sends out exhaust gas to a muffler 16 on the vehicle's rear side.

The swingarm 15, pivotally held by the pivot 22, rotatably holds the rear wheel WR. The swingarm 15 holds a rear-wheel brake caliper BR, i.e., a rear-wheel brake that applies braking force to a rear-wheel brake disc 33 rotating in synchronization with the rear wheel WR. On the right side in the vehicle width direction, the pivot frame F3 swingably holds a brake pedal 50, i.e., a rear-wheel brake operating element for the driver to operate with his/her right foot.

A front cowl 7 is disposed in front of the head pipe F1. The front cowl 7 supports a headlamp 9, a windshield screen 6, and a pair of right and left front flasher lamps 8. A fuel tank 3 is disposed behind the front cowl 7 and above the main frames F2. The pivot frame F3 has its rear part fixed to a rear frame F4 that supports a front seat 21 for the driver and a rear seat 20 for the passenger. Both lateral sides of the rear frame F4 are covered with a rear cowl 19. A rear fender 38 is mounted on the rear end of the rear cowl 19. The rear fender 38 supports a tail lamp device 18 and a pair of right and left rear flasher lamps 17.

A control device 70 for controlling a fuel injection device, an ignition device, a brake system, and others is disposed above the power unit P. A front-wheel brake actuator (hereinafter simply referred to as the actuator) 52 generating a brake fluid pressure for the front-wheel brake BF and a rear-wheel brake actuator 62 generating a brake fluid pressure for the rear-wheel brake BR are disposed above the vehicle body frame F. A front-wheel brake fluid pressure sensor 53 and a rear-wheel brake fluid pressure sensor 63 for detecting the brake fluid pressure of the front-wheel brake BF and that of the rear-wheel brake BR are disposed near the actuators 52, 62. A front-wheel brake operation force sensor 51 for detecting an operation force received at the brake lever 50 is disposed near the brake lever 50. A rear-wheel brake operation force sensor 61 for detecting an operation force received at the brake pedal 60 is disposed near the brake pedal 60.

A seat sensor 76 for detecting the seated state of the driver is disposed inside the front seat 21. A road surface sensor 77 for sensing whether the road surface is wet is disposed on the side inner than the underguard 12.

A forward camera 80 and a forward radar 81 for use in automatic brake system control are disposed behind the windshield screen 6. The brake system according to the present embodiment is configured as follows. Normally, the actuators 52, 62 generate a brake fluid pressure corresponding to an operation force on the brake operating elements 50, 60. When an automatic control condition is met, such as the approach of an obstacle detected by the forward camera 80 and the forward radar 81, the control device 70 automatically generates an optimum brake fluid pressure even when there is no operation on the brake operating elements 50, 60. Under the automatic control of the brake system, the front/rear distribution, such as Front 7: Rear 3, or Front 6: Rear 4, is also automatically set according to vehicle speed, vehicle attitude, road surface condition, and the like.

Figure 2:
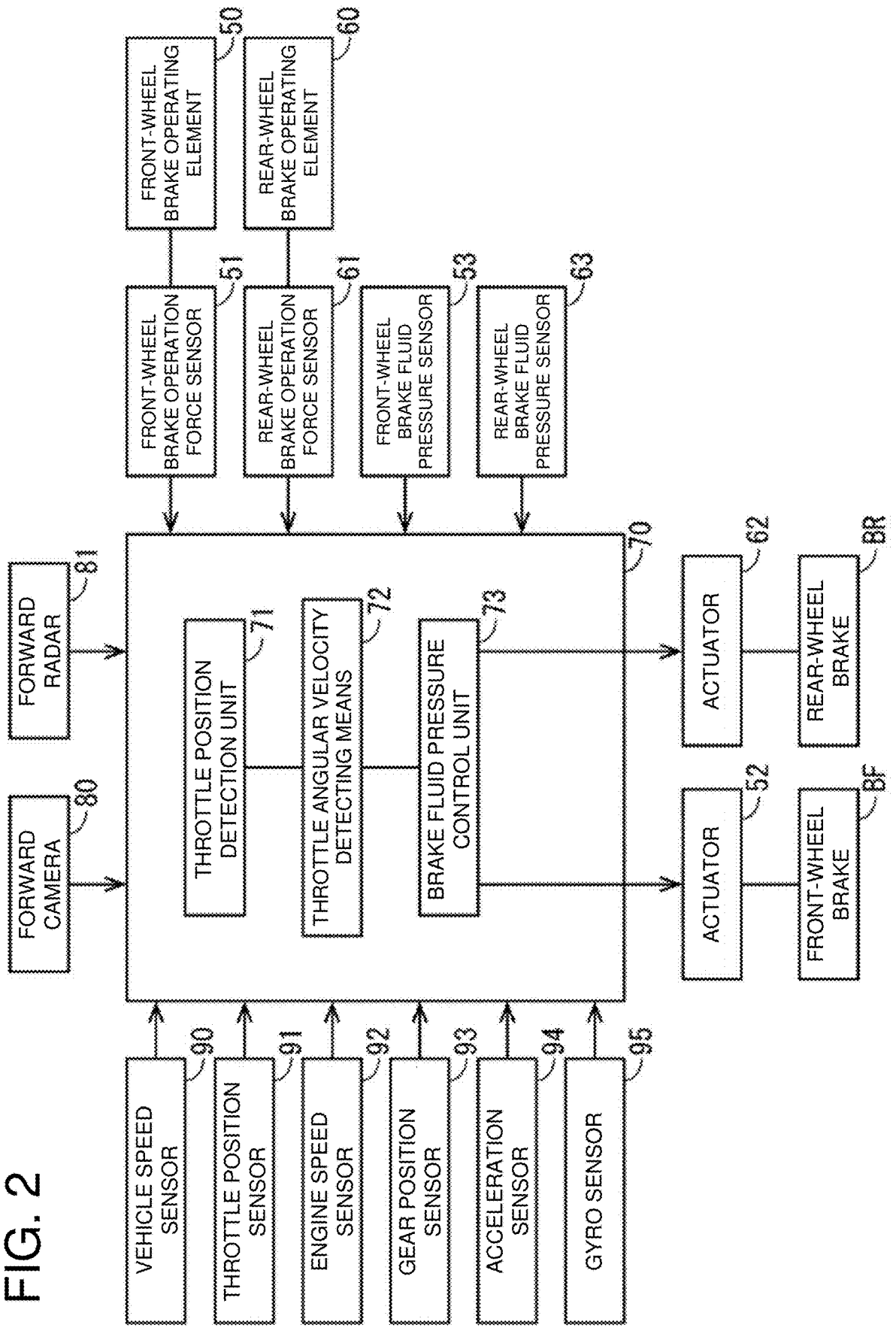
FIG. 2 is a block diagram of the configuration of the brake system according to the present embodiment.

FIG. 2 is a block diagram of the configuration of the brake system according to the present embodiment. The control device 70 includes a throttle position detection unit 71, a throttle angular velocity detection unit 72, and a brake fluid pressure control unit 73. The control device 70 receives information from the forward camera 80, the forward radar 81, a vehicle speed sensor 90, a throttle position sensor 91, an engine speed sensor 92, a gear position sensor 93, an acceleration sensor 94, and a gyro sensor 95. The gyro sensor 95 detects the roll angle, pitch angle, and yaw angle of the vehicle body.

The brake fluid pressure control unit 73 drives actuators 52, 62 according to the information from various sensors so that the front-wheel brake BF and the rear-wheel brake BR exert a braking force. The present embodiment is characterized in that, even when a rotary operation is made on the throttle operating element (throttle grip) at the start of automatic brake system control, if a throttle position Th detected by the throttle position sensor 91 is less than a predetermined threshold value Th1 (e.g., 10 degrees), the automatic control is started.

Figure 3:
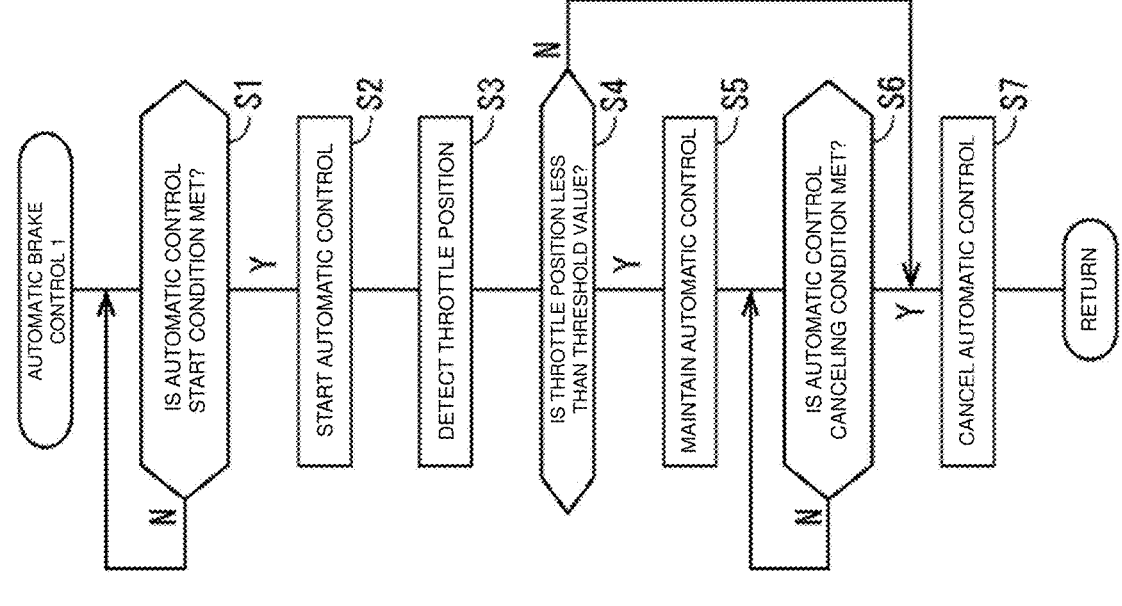
FIG. 3 is a flowchart of the procedure in automatic brake control 1 according to the present embodiment.

FIG. 3 is a flowchart of the procedure in automatic brake control 1 according to the present embodiment. In step S1, whether a condition for actuating automatic control is met is determined. When the determination is positive, control proceeds to step S2. When the determination is negative in step S1, control returns to the determination in step S1.

In step S2, the automatic brake system control is started. In step S3, the throttle position Th is detected. In the next step S4, whether the throttle position Th is less than the predetermined threshold value Th1 is determined. When the determination is positive in step S4, control proceeds to step S5 and the automatic brake system control is maintained. In the next step S6, whether an automatic control canceling condition is met is determined.

When the determination is positive in step S6, control proceeds to step S7 to cancel the automatic brake system control. The automatic control canceling condition may include the following: the vehicle speed is equal to or lower than a predetermined value, the operation force on the brake operating element is equal to or greater than a predetermined value, the throttle operation volume and speed are equal to or greater than a predetermined value, and the vehicle roll angle is equal to or greater than a predetermined value.

On the other hand, when the determination is negative in step S4, the automatic control is not maintained and control proceeds to step S7, and the control procedure ends. When the determination is negative in step S6, control returns to the determination in step S6.

Figure 4:
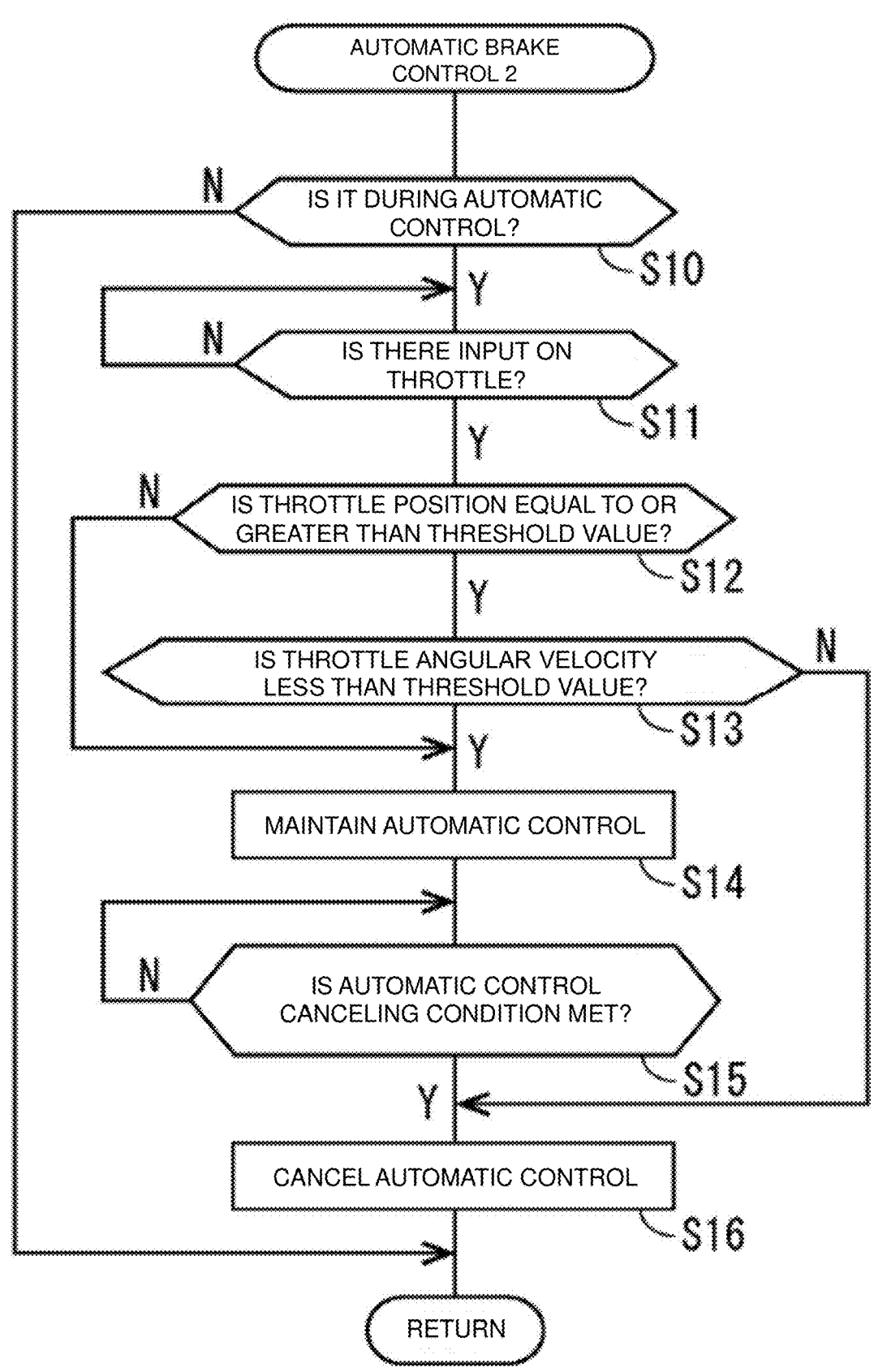
FIG. 4 is a flowchart of the procedure in automatic brake control 2 according to the present embodiment.

FIG. 4 is a flowchart of the procedure in automatic brake control 2 according to the present embodiment. The present embodiment is characterized in that, when the throttle operation is made during automatic brake system control, the automatic control is maintained if the throttle position Th is equal to or greater than a predetermined threshold value Th and a throttle angular velocity co is less than a predetermined threshold value $\omega 1$ (e.g., 1 degree/sec), and the automatic brake system control is canceled if the throttle position Th is equal to or greater than the predetermined threshold value Th1 and the throttle angular velocity co is equal to or greater than predetermined threshold value $\omega 1$. The throttle angular velocity co is calculated by the output of the throttle position sensor 91 and the output of a timer in the control device 70.

In step S10, whether it is during automatic brake system control is determined. When the determination is positive in step S10, control proceeds to step S11 to determine whether a throttle operation is made. When the determination is positive in step S11, control proceeds to step S12 to determine whether the throttle position Th is equal to or greater than the predetermined threshold value Th1. Note that, when the determination is negative in step S10, the control procedure ends as it is.

When the determination is positive in step S12, control proceeds to step S13 to determine whether the throttle angular velocity co is less than the predetermined threshold value $\omega 1$. When the determination is positive in step S13, control proceeds to step S14 to maintain the automatic control. On the other hand, when the determination is negative in step S12, control proceeds to step S14 to maintain the automatic control.

In step S15, whether an automatic control canceling condition is met is determined. When the determination is positive in step S15, control proceeds to step S16 to cancel the automatic control. On the other hand, when the determination is negative in step S15, control returns to the determination in step S15. When the determination is negative in step S13, control proceeds to step S16 to cancel the automatic control.

As described above, according to the brake system for a saddled vehicle according to the present embodiment, when the control device 70 detects an operation on the throttle operating element in starting automatic control over the front-wheel brake BF and the rear-wheel brake BR, the control device 70 starts the automatic control if the throttle position Th is less than the predetermined threshold value Th1. Thus, automatic control will start despite the situation where the driver trying to recover his/her forward-leaning upper body puts extra force on the steering handlebars, unintentionally rotating the throttle grip. This avoids cancellation of necessary automatic control.

When the control device 70 detects a rotary operation on the throttle operating element during automatic control over the front-wheel brake BF and the rear-wheel brake BR, the control device 70 maintains automatic control if the throttle position Th is equal to or greater than the predetermined threshold value Th1 and the angular velocity co of the throttle operating element is less than the predetermined threshold value $\omega 1$. Here, there may be a situation where the driver tries to recover his/her forward-leaning upper body in a deceleration suddenly started by automatic brake system control. When the driver in such a situation gradually applies force to the steering handlebars and hence slowly increases the throttle position, the system determines that the throttle operation is not intended by the driver even when the throttle position becomes equal to or greater than a predetermined threshold value, and maintains the automatic brake system control. This avoids a reduction in the braking force that would affect the vehicle's behavior.

When the control device 70 detects a rotary operation on the throttle operating element during automatic control over the front-wheel brake BF and the rear-wheel brake BR, the control device 70 cancels the automatic control if the throttle position Th is equal to or greater than the predetermined threshold value Th1 and the angular velocity co of the throttle operating element is equal to or greater than the predetermined threshold value $\omega 1$. Thus, when the values are equal to or greater than the threshold values, the system determines that the throttle operation is intended by the driver and cancels the automatic brake system control. This achieves the vehicle's behavior desired by the driver.

Note that, the mode of the motorcycle, the configuration of the brake system, the mode of the front-wheel brake operating element and that of the rear-wheel brake operating element, and the setting of the predetermined threshold value are not limited to those in the embodiment, and various changes may be made. The brake system of the present invention is applicable not only to a motorcycle but also to a saddled three- or four-wheeled vehicle and others.

REFERENCE SIGNS LIST

1: motorcycle (saddled vehicle)
52: front-wheel brake actuator
62: rear-wheel brake actuator
70: control device
71: throttle position detection unit
72: throttle angular velocity detection unit
73: brake fluid pressure control unit
80: forward camera
81: forward radar
91: throttle position sensor
BF: front-wheel brake
BR: rear-wheel brake
The invention claimed is:
1. A saddled vehicle, comprising:
a head pipe positioned at a front end of a vehicle body frame;
a steering handlebar disposed above the head pipe;
a seat on which a driver sits, the seat disposed rearward of the head pipe with a fuel tank between the seat and the head pipe;
a controller exerting automatic control over a brake fluid pressure according to various information;
a rotary-type throttle operating element mounted on a right side of the steering handlebar; and
a throttle position detector configured to detect a throttle position of the throttle operating element,

wherein when an operation on the throttle operating element is detected during automatic brake control,
if the throttle position is less than a first threshold value, the controller maintains the automatic control, and
if the throttle position is equal to or greater than the first threshold value, and
if an angular velocity of the throttle operating element is less than a second threshold value, the controller maintains the automatic control, and
if the angular velocity of the throttle operating element is equal to or greater than the second threshold value, the controller cancels the automatic control.

* * * * *